(12) United States Patent
Burke et al.

(10) Patent No.: US 8,501,119 B2
(45) Date of Patent: *Aug. 6, 2013

(54) CONTACTLESS POWER SOLUTION FOR LOW POWER SENSORS IN BIOPROCESS ENVIRONMENTS

(75) Inventors: Aaron Burke, Hamilton, MA (US); Jiwan Adhikari, Burlington, MA (US)

(73) Assignee: EMD Millipore Corporation, Billerica, MA (US)

( * ) Notice: Subject to any disclaimer, the term of this patent is extended or adjusted under 35 U.S.C. 154(b) by 1207 days.

This patent is subject to a terminal disclaimer.

(21) Appl. No.: 12/079,396

(22) Filed: Mar. 26, 2008

(65) Prior Publication Data

US 2009/0246090 A1 Oct. 1, 2009

(51) Int. Cl.
*B01D 35/00* (2006.01)

(52) U.S. Cl.
USPC ........... 422/534; 422/547; 422/549; 422/555; 206/459.1; 206/459.5; 340/572.7

(58) Field of Classification Search
USPC .. 422/547, 549, 550, 555, 565, 534; 340/571, 340/572.1, 572.3, 572.7, 572.8, 572.9; 206/205, 206/206, 216, 223, 459.1, 459.5, 569
See application file for complete search history.

(56) References Cited

U.S. PATENT DOCUMENTS

| 5,581,019 | A | 12/1996 | Minor et al. |
| 5,674,381 | A | 10/1997 | Den Dekker ................... 210/85 |
| 7,048,775 | B2 | 5/2006 | Jornitz et al. ..................... 95/1 |
| RE39,361 | E | 10/2006 | Den Dekker ................... 210/85 |
| 7,259,675 | B2 | 8/2007 | Baker et al. ................. 340/572.1 |
| 7,811,665 | B2 | 10/2010 | Manifold et al. |
| 7,898,495 | B2 * | 3/2011 | Burke et al. ................... 343/872 |
| 7,969,380 | B2 | 6/2011 | Burke et al. |
| 2002/0021208 | A1 * | 2/2002 | Nicholson et al. ......... 340/10.34 |
| 2003/0047517 | A1 | 3/2003 | Schoess |
| 2003/0127644 | A1 | 7/2003 | Chen ............................... 257/44 |

(Continued)

FOREIGN PATENT DOCUMENTS

| CN | 1370134 A | 9/2002 |
| CN | 101073732 A | 11/2007 |

(Continued)

OTHER PUBLICATIONS

Office Action dated Jul. 29, 2010 in co-pending U.S. Appl. No. 12/079,314.

(Continued)

*Primary Examiner* — Jill Warden
*Assistant Examiner* — Dwayne K Handy
(74) *Attorney, Agent, or Firm* — Nields, Lemack & Frame, LLC

(57) ABSTRACT

A method and apparatus for providing more reliable wireless communication and power to sensors in electrically challenging bioprocess environments is disclosed. An unconnected antenna is located within the bioprocess environment, preferably in the same plane as the primary powered antenna. This unconnected antenna, also referred to as reflective antenna, enhances and confines the electromagnetic field created by the powered antenna. This reflective antenna is incorporated in or proximate to the devices containing a sensor or communication device. In one embodiment, the reflective antenna is incorporated into the filter housing. In another embodiment, it is incorporated into the filtering element itself. In another embodiment, it is incorporated into or affixed on the disposable bioprocess components, such as bags and tubes.

22 Claims, 5 Drawing Sheets

U.S. PATENT DOCUMENTS

| | | | |
|---|---|---|---|
| 2004/0032330 A1* | 2/2004 | Hoffman | 340/572.1 |
| 2004/0182761 A1 | 9/2004 | Kuennen et al. | 210/136 |
| 2004/0256328 A1 | 12/2004 | Jornitz et al. | 210/739 |
| 2005/0205658 A1 | 9/2005 | Baker et al. | 235/375 |
| 2006/0178695 A1 | 8/2006 | Decant, Jr. et al. | 606/200 |
| 2007/0200703 A1 | 8/2007 | Baker et al. | 340/572.1 |
| 2007/0210923 A1 | 9/2007 | Butler et al. | 340/572.8 |
| 2007/0240492 A1* | 10/2007 | DiLeo et al. | 73/38 |
| 2007/0240578 A1 | 10/2007 | DiLeo | 96/417 |
| 2007/0243113 A1 | 10/2007 | DiLeo | 422/119 |
| 2007/0262867 A1 | 11/2007 | Westrick et al. | 340/572.7 |
| 2008/0042837 A1 | 2/2008 | Burke | |
| 2008/0065290 A1 | 3/2008 | Breed et al. | 701/29 |
| 2008/0069736 A1* | 3/2008 | Mingerink et al. | 422/102 |
| 2008/0087588 A1 | 4/2008 | Grzonka et al. | |
| 2009/0225626 A1 | 9/2009 | Baumfalk et al. | |
| 2013/0057081 A1 | 3/2013 | Burke et al. | |

FOREIGN PATENT DOCUMENTS

| | | |
|---|---|---|
| CN | 101122947 A | 2/2008 |
| EP | 2264304 A1 | 12/2010 |
| JP | 2002-531237 A | 9/2002 |
| JP | 2003-232444 A | 8/2003 |
| JP | 2003-262274 A | 9/2003 |
| JP | 2005-102101 A | 4/2005 |
| JP | 2007-312004 A | 11/2007 |
| JP | 2007-537870 A | 12/2007 |
| WO | 00/40322 A1 | 7/2000 |
| WO | 00/78681 A2 | 12/2000 |
| WO | 2005/113112 A1 | 12/2005 |
| WO | 2006/045477 | 5/2006 |
| WO | 2006/130528 | 12/2006 |

OTHER PUBLICATIONS

Notice of Allowance dated Nov. 3, 2010 in co-pending U.S. Appl. No. 12/079,314.

Notice of Allowance dated Mar. 31, 2011 in co-pending U.S. Appl. No. 13/020,914.

Japanese Communication, with English translation, mailed Oct. 2, 2012 in corresponding Japanese Patent Application No. 2011-501789.

Chinese Communication issued Sep. 25, 2012 in corresponding Chinese patent application No. CN 200980110733.8.

Chinese Communication issued Sep. 5, 2012 in co-pending Chinese patent application No. CN 200980110732.3.

Supplementary European Search Report completed Jan. 13, 2012 in co-pending European patent application No. EP 09725626.

Japanese Communication, with English translation, mailed Aug. 14, 2012 in co-pending Japanese Patent Application No. 2011-501787.

Office Action mailed Jan. 18, 2013 in corresponding U.S. Appl. No. 13/664,893.

Notice of Allowance mailed May 8, 2013 in corresponding U.S. Appl. No. 13/664,893.

* cited by examiner

CONTACTLESS POWER SOLUTION FOR LOW POWER SENSORS IN BIOPROCESS ENVIRONMENTS

BACKGROUND OF THE INVENTION

The use of RFID tags and other electronic devices, such as Bluetooth® and Zigbee® devices has become prevalent, especially in the management of assets, particularly those applications associated with inventory management. For example, the use of RFID tags permits the monitoring of the production line and the movement of assets or components through the supply chain.

To further illustrate this concept, a manufacturing entity may adhere RFID tags to components as they enter the production facility. These components are then inserted into the production flow, forming sub-assemblies in combination with other components, and finally resulting in a finished product. The use of RFID tags allows the personnel within the manufacturing entity to track the movement of the specific component throughout the manufacturing process. It also allows the entity to be able to identify the specific components that comprise any particular assembly or finished product.

In addition, the use of RFID tags has also been advocated within the drug and pharmaceutical industries. In February 2004, the United States Federal and Drug Administration issued a report advocating the use of RFID tags to label and monitor drugs. This is an attempt to provide pedigree and to limit the infiltration of counterfeit prescription drugs into the market and to consumers.

Since their introduction, RFID tags have been used in many applications, such as to identify and provide information for process control in filter products. U.S. Pat. No. 5,674,381, issued to Den Dekker in 1997, (U.S. ReIssue Pat. No. 39,361E) discloses the use of "electronic labels" in conjunction with filtering apparatus and replaceable filter assemblies. Specifically, the patent discloses a filter having an electronic label that has a read/write memory and an associated filtering apparatus that has readout means responsive to the label. The electronic label is adapted to count and store the actual operating hours of the replaceable filter. The filtering apparatus is adapted to allow use or refusal of the filter, based on this real-time number. The patent also discloses that the electronic label can be used to store identification information about the replaceable filter.

U.S. Pat. No. 7,259,675 issued to Baker et al, discloses a process equipment tracking system. This system includes the use of RFID tags in conjunction with process equipment. The RFID tag is described as capable of storing "at least one trackable event". These trackable events are enumerated as cleaning dates, and batch process dates. The publication also discloses an RFID reader that is connectable to a PC or an internet, where a process equipment database exists. This database contains multiple trackable events and can supply information useful in determining "a service life of the process equipment based on the accumulated data". The application includes the use of this type of system with a variety of process equipment, such as valves, pumps, filters, and ultraviolet lamps.

In addition to RFID tags, the possibility exists to include other electronics in the filtering elements as well. U.S. Pat. No. 7,048,775, issued to Jornitz et al discloses a device and method for monitoring the integrity of filtering installations. This patent describes the use of filters containing an onboard memory chip and communications device, in conjunction with a filter housing. The filter housing acts as a monitoring and integrity tester. That application also discloses a set of steps to be used to insure the integrity of the filtering elements used in multi-round housings. These steps include querying the memory element to verify the type of filter that is being used, its limit data, and its production release data.

More and more, other electronics such as sensors, including pressure sensors, temperature sensors and concentration sensors, have also been added to filtering elements to further expand the capabilities of these devices. Co-pending U.S. Patent Application Publication Nos. 2007/0240578, 2007/0243113 and 2007/0240492 all describe additional electronics that can be added to filtering elements to improve system performance and availability.

However, despite the rapid increase in the ability and the desire to add advanced electronics to filtering elements, there remain significant drawbacks. For example, the issue of effectively communicating to an electronic device within a stainless steel (or other metal) housing remains problematic.

Similarly, disposable bioprocess systems may also present wireless power and communication difficulties. In this environment, disposable components are often mated with one or more wireless electronic device, such as an RFID tag, a temperature or pressure sensor, or other suitable component. Although these disposable systems are not contained in a metal housing, their environment may still be electrically challenging. For example, the typical bioprocess system passes fluids. Fluids and other aqueous environments are known to distort or attenuate wireless signals, and therefore have a negative effect on any wireless power or communication scheme. Furthermore, these disposable systems, while primarily constructed of plastic, are often supported by metal structures or fixtures. These metal structures, like fluids, tend to degrade or distort the wireless signals in their vicinity. Furthermore, the size of a disposable bioprocess setup may be sufficiently large so as to make the distance from the antenna to the sensors within the disposable components problematic. Thus, disposable systems may encounter the same issues regarding wireless communication and power that affects bioprocess system contained in traditional housing environments.

A more reliable system and method of communicating with and wirelessly powering devices in electrically challenging bioprocess environments is needed.

SUMMARY OF THE INVENTION

The problems of the prior art are minimized by the present invention, which discloses a method and apparatus for providing more reliable wireless communication and power to sensors in electrically challenging bioprocess environments.

An unconnected antenna is located within the bioprocess environment. In essence, this unconnected antenna is an unpowered electromagnetically resonant circuit, designed to resonate with a powered antenna, emitting at specific frequency. This unconnected antenna, also referred to as a reflective antenna, enhances and controls the electromagnetic field created by the powered antenna. This reflective antenna is incorporated in or proximate to the devices containing a sensor or communication device. Since electromagnetic induction is dependant on the design, or shape, of the antenna the reflective antenna can be a magnetic loop or electrical dipole.

In one embodiment, an inductive field is created by a loop antenna. The location of this loop antenna may be limited by constraints within the bioprocess environment. For example, it may be impractical to locate the loop sufficiently close to the communication device in the filtering element. There may be various reasons for this, including concerns about the effects that the loop may have on temperature distribution, or fluid flow. Thus, the efficacy of the inductive loop is compromised. This fact, coupled with the amount of fluid and metal in the environment, can greatly degrade the performance of the inductive loop.

By placing a reflective antenna in or near the electronic components in the system, the electromagnetic field can be enhanced and properly confined. In one embodiment, the reflective antenna is incorporated into the filter housing. In another embodiment, it is incorporated into the filter element itself. In yet another embodiment, it is incorporated into the disposable bioprocess components, such as bioreactor bags and tubes.

DETAILED DESCRIPTION OF THE FIGURES

It is well known that induction can be utilized to provide power to a device to which there is no physical connection. Typically, a wire coil is wound a number of times, and an alternating current is passed through it. This alternating current produces a changing magnetic field around the coil. A secondary coil, located in a device physically separate and remote from the first coil, can then be used to convert this changing magnetic field back into an alternating current. This current can then be used by the device to power its integrated electronics.

Figure 1:
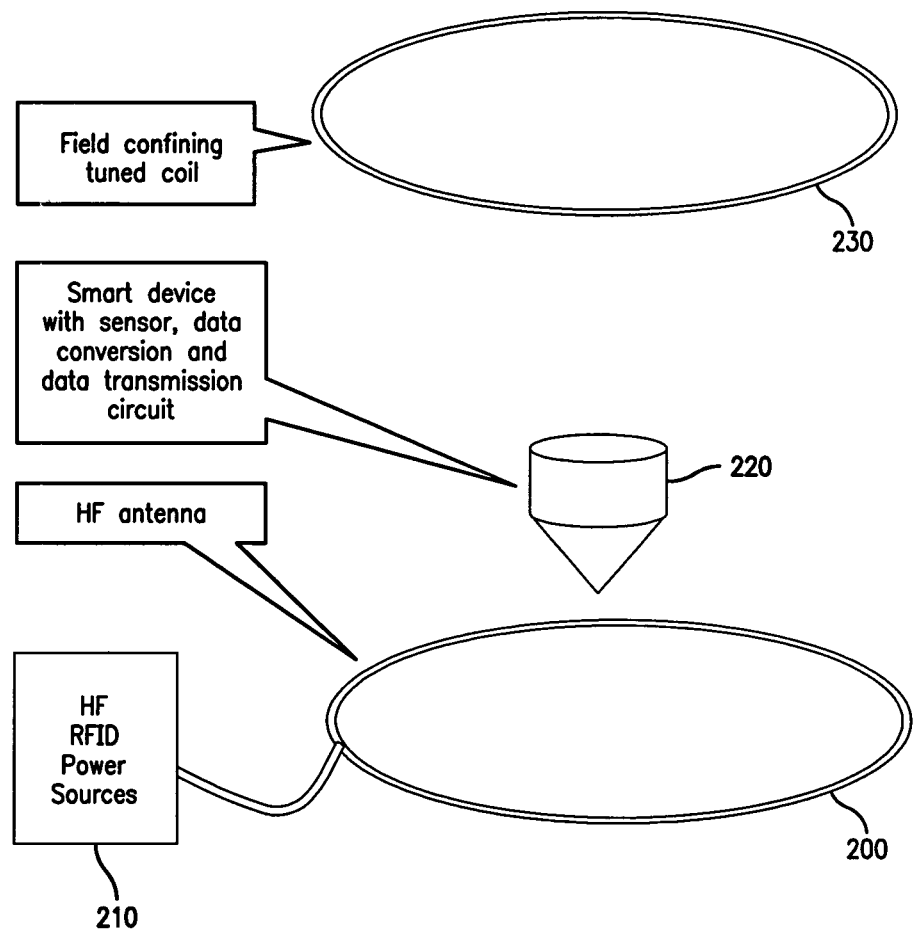
FIG. 1 is a simplified illustration showing the major components of the present invention.

FIG. 1 shows a simplified illustration of the major elements used in the present invention. Powered loop 200 is connected to a power source 210, preferably supplying alternating current. The frequency at which this current oscillates is not critical to the present invention, and all frequencies are contemplated. In certain embodiments, specific frequencies or frequency ranges may be preferable due to the interaction of the electromagnetic field with any other wireless activities that may be present. For example, in a particular embodiment, wireless communications may be occurring at 2.4 GHz. In this case, the frequency of the powered loop may preferably be in the megahertz range, such as 13.56 MHz or 950 MHz. Pictured above the power loop 200 is the electronic device 220 of interest. This device 220 may be a sensor, an RFID tag, or any other suitable electronic component or set of components. Because of the electronics incorporated in the device, it is also known as a smart device. Additionally, this device typically also has a communication component, such as a wireless transmitter. This device may also include a storage element, such as a RAM or ROM. Within the device 220 is a small loop antenna, adapted to receive the electromagnetic field generated by the power loop 200, and convert it to alternating current. The power generated in the device 220 is then used to power the remaining electronics in the smart device. The amount of energy supplied to the device is a function of the strength of the electromagnetic field near the device, as well as the magnetic flux density related to the size of the coil in the device and the number of windings. Reflective antenna 230 is shown above both the powered loop 200 and the electronic device 220. As stated above, a reflective antenna is an unpowered electromagnetically resonant loop or circuit, designed to resonate with a powered antenna, emitting at a predetermined frequency. In this position, the reflective antenna 230 has the ability to enhance and confine the electromagnetic field between it and the powered loop 200, at this predetermined frequency. Thus, electronic device 220 experiences an enhanced electromagnetic flux, allowing more power to be induced within the device 220. This allows the operation of the device 220 in environments where the powered loop 200 alone would be insufficient to supply the needed field.

Figure 2:
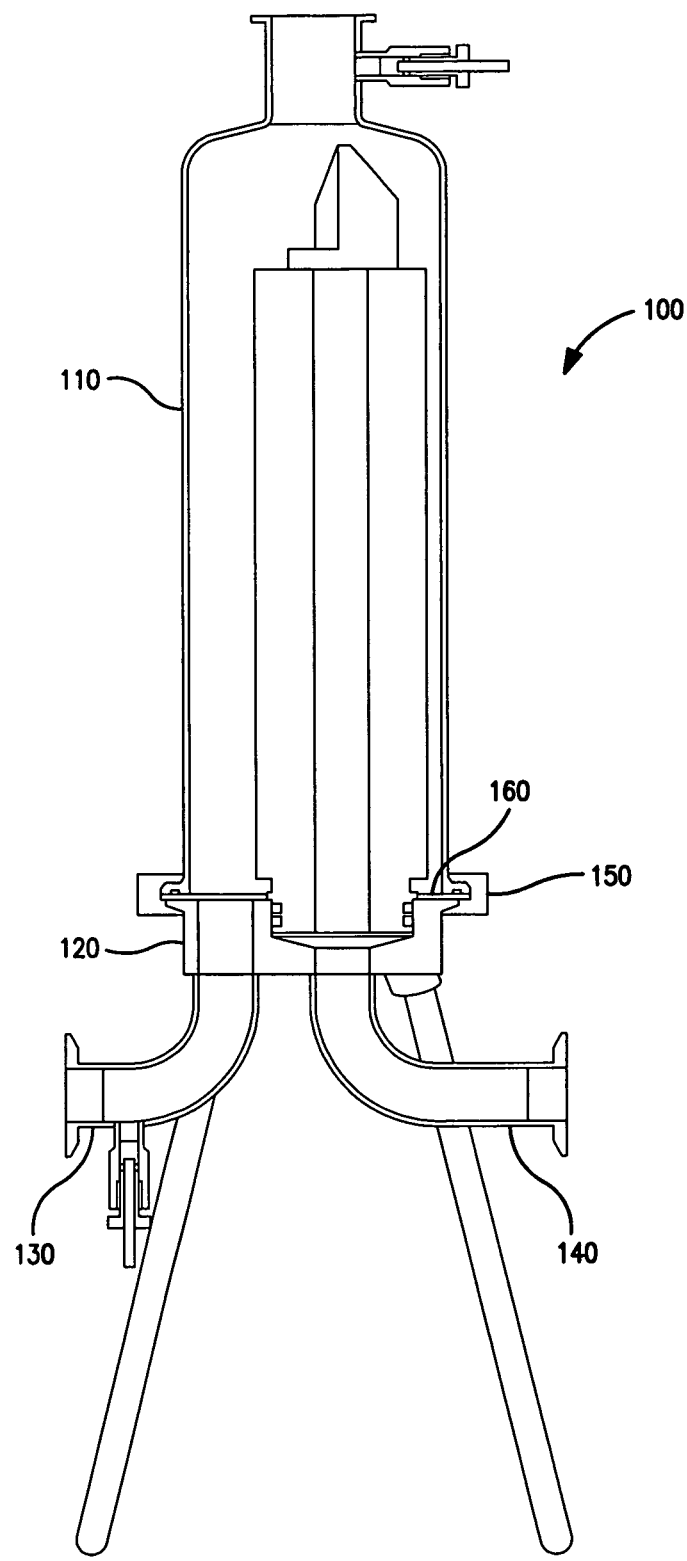
FIG. 2 shows a representative stainless steel housing that can be used with one embodiment of the present invention.

FIG. 2 shows a conventional stainless steel housing assembly 100 used in the filtering of pharmaceuticals and other fluids. In a traditional system, the housing assembly 100 is divided into two parts; an upper housing 110 and a lower housing 120. The lower housing 120 is typically fixed in place, as it contains the plumbing and electrical connections to the unit. Unfiltered fluids enter the lower housing 120 through an inlet conduit 130 and filtered materials exit the lower housing 120 via an outlet conduit 140.

Traditionally, stainless steel is used to make these housings. However, other metals can also be utilized. In another embodiment, plastic material can also be molded to form the housing components.

One or more filter elements may be installed in the lower housing. After these elements are installed, the upper housing 110 is positioned atop the lower housing, and secured in place. Typically fasteners 150, such as metal clasps, Triclamps, Laddish clamps or band clamps, are used to hold the two portions together.

To insure a proper seal between the upper and lower housings, a gasket 160, such as an O-ring, is typically utilized. In most cases, this gasket 160 is ring-shaped, or annular. This gasket 160 is constructed from a biocompatible material, which is able to withstand the temperatures attained within the housing. In addition, the material must also be sufficiently elastic, so as to form an air and fluid tight seal. In a preferred embodiment, a silicone-based material is molded into the required shape. This gasket 160 is then placed between the upper 110 and lower housings 120, preferably in a groove formed in one or both of the upper and lower housings to ensure proper alignment during assembly.

In one embodiment, one or more electrical conduits (not shown), such as wires, are molded into the gasket 160. The gasket 160 is preferably produced using a double molding process, so as to insure that the conduits are completely encapsulated within the gasket material.

Figure 3:
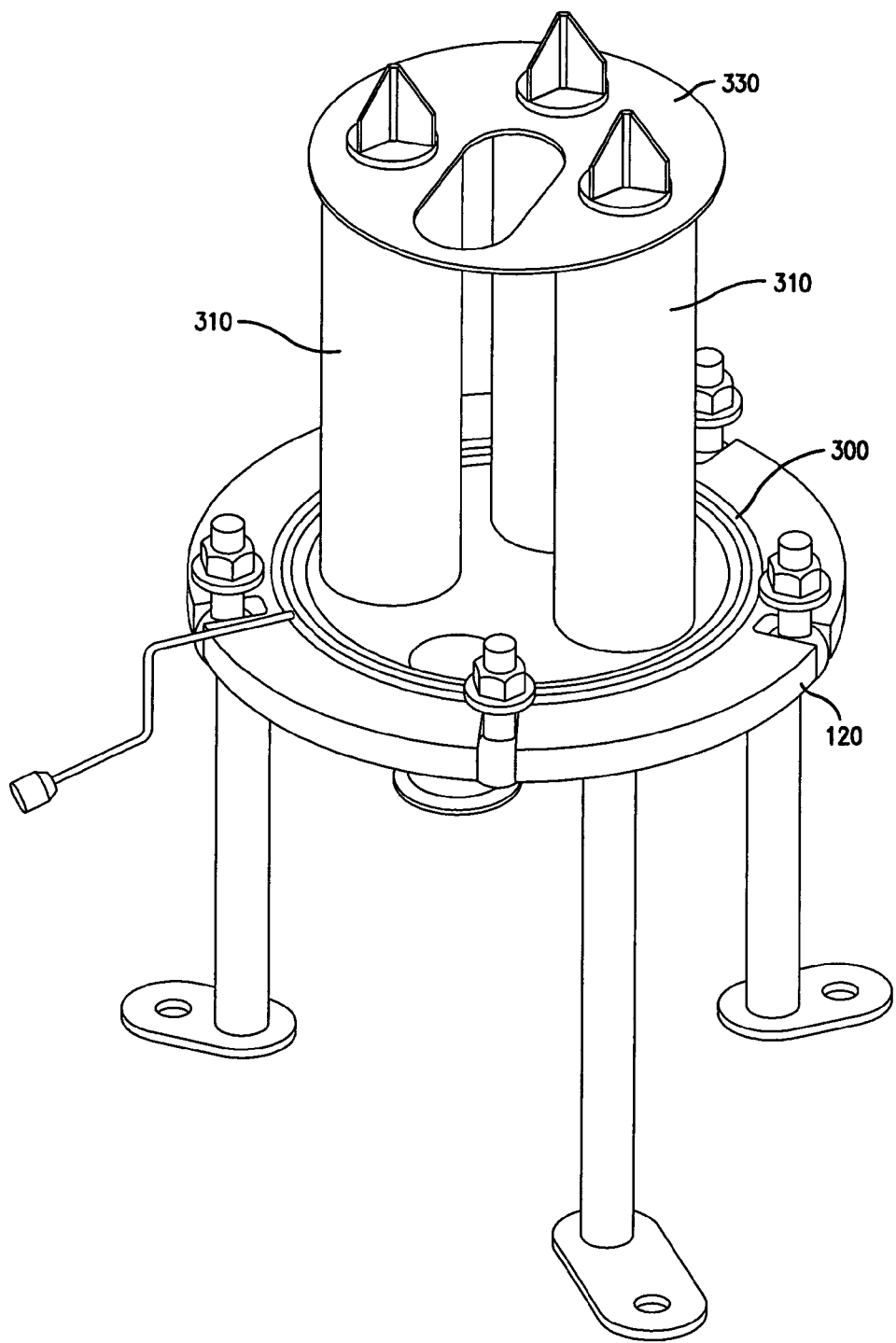
FIG. 3 shows the inductive loop used in one embodiment of the present invention.

In one embodiment, one large powered inductive loop is provided along the inner circumference of the annular gasket, as shown in FIG. 3. An electrical conduit encircles the gasket 300 a plurality of times, with a greater number of windings inducing a greater magnetic field. This embodiment provides the least disruption to the normal fluid flow within the housing assembly. Note that in FIG. 3, three filter elements 310 are shown. The invention is not limited to this embodiment; more or fewer filtering elements can be utilized. Typically, such systems use 1, 3, 5, 10, 12, 24 or 30 filter elements in a housing.

To enhance or confine the field, an unconnected, or reflective, antenna (not shown) is inserted into the environment. The placement of this reflective antenna is critical to achieve the required result. In one embodiment, the reflective antenna is located within the filtering element itself.

Figure 4:
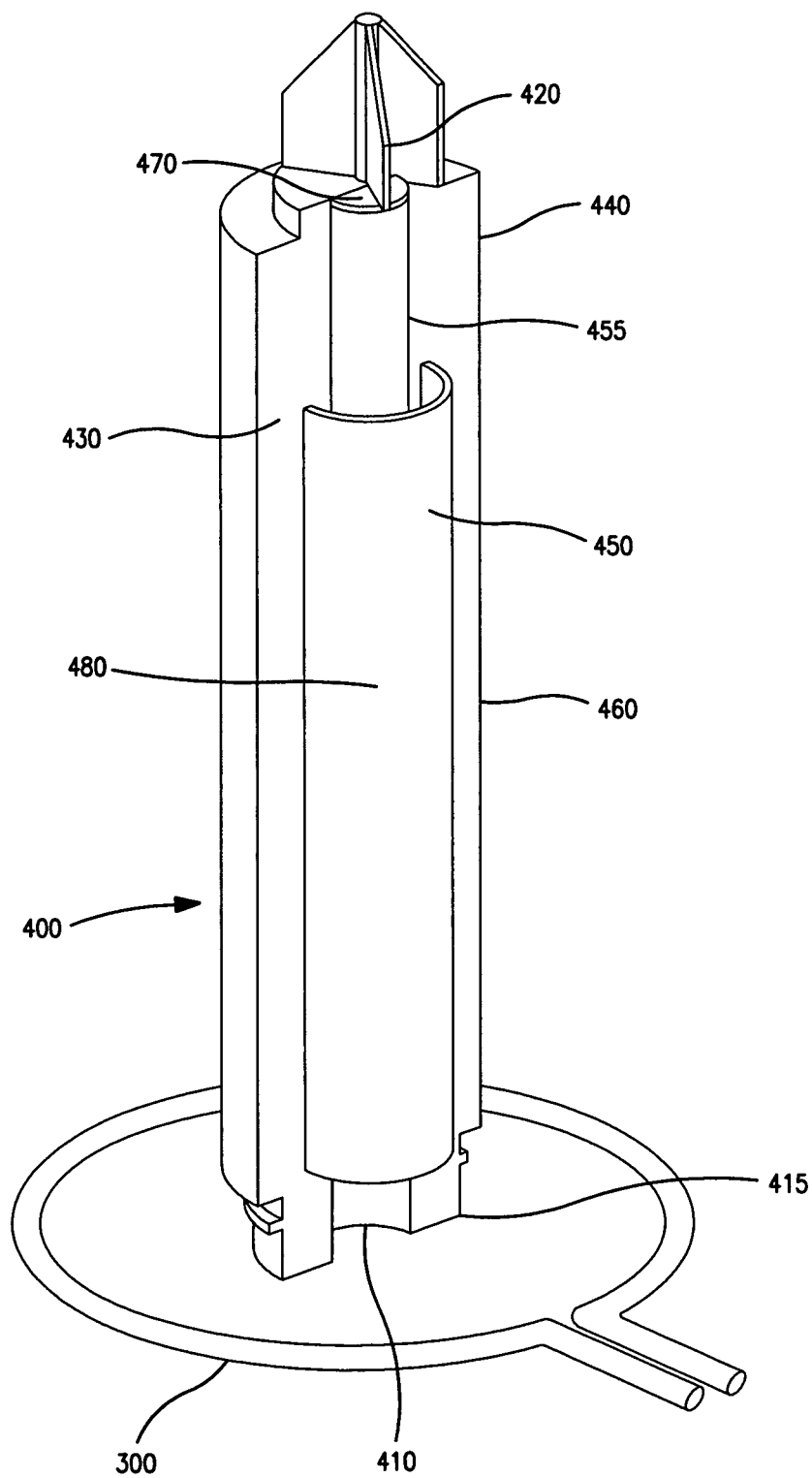
FIG. 4 shows one embodiment of the present invention.

FIG. 4 shows a traditional filtering element 400. The filtering element 400, is formed of a first endcap 420 and second endcap 415, a porous core 450 and a membrane 430. As can be shown in this drawing, there is an outlet 410 extending from the second endcap 415. The edge seals (not shown) are bonded to the first and second endcaps to form an integral, fluid tight seal between the edges of the membranes and the endcaps such that all fluid on the outside of the cartridge must pass through the membrane 430 before reaching the cartridge interior or outlet 410. Outside of the membrane is an outer cage 440 that is porous. The cage 440 is preferably plastic, which is able to withstand the elevated temperatures within the housing. The resulting filtering element 400 therefore has a hollow inner cylinder, with one open end and one closed end and an outer cylinder. The area between these two cylinders defines the frame of the element, and the location of the membrane or filter material. Unfiltered material is presented on the outer surface of the filtering element, passes through the filter material, and exits via the open end of the cylinder.

The filter may be made of one or more membranes of any variety commonly used in filtering including but not limited to microporous membranes, ultrafiltration membranes, nanofiltration membranes, or reverse osmosis membranes. Preferably microporous membranes are used. Representative suitable microporous membranes include nitrocellulose, cellulose acetate, polysulphones including polyethersulphone and polyarylsulphones, polyvinylidene fluoride, polyolefins such as ultrahigh molecular weight polyethylene, low density polyethylene and polypropylene, nylon and other polyamides, PTFE, thermoplastic fluorinated polymers such as poly (TFE-co-PFAVE), e.g. PFA, polycarbonates or particle filled membranes such as EMPORE® membranes available from 3M of Minneapolis, Minn. Such membranes are well known in the art, may be symmetrical or asymmetrical or a combination of the two and are commercially available from a variety of sources including Durapore® membranes and Millipore Express® membranes available from Millipore Corporation of Bedford, Mass.

Representative ultrafiltration or nanofiltration membranes include polysulphones, including polyethersulphone and polyarylsulphones, polyvinylidene fluoride, and cellulose. These membranes typically include a support layer that is generally formed of a highly porous structure. Typical materials for these support layers include various non-woven materials such as spun bounded polyethylene or polypropylene, or glass or microporous materials formed of the same or different polymer as the membrane itself. Such membranes are well known in the art, and are commercially available from a variety of sources such as Millipore Corporation of Bedford, Mass.

Numerous patent applications, including co-pending Patent Application Publication Nos. 2007/0240578, 2007/0243113 and 2007/0240492 all describe additional electronics that can be added to filtering elements to improve system performance and availability. Many of these electronic devices 470 are most advantageously located within the hollow inner cylinder of the filtering element. In this manner, temperature, pressure, concentration and other parameters of the filtered material can be measured. Furthermore, often it is desirable to place the electronic device 470 on or affixed to the closed end 420 of the filtering element.

The size of these filtering elements often means that there may be many inches, and sometimes several feet, between the base of the filtering element (i.e. the open end) and the opposite closed end, where the electronic device is generally located. With the powered inductive loop 300 being located near the open end, as shown in FIGS. 2 and 3, this distance may be problematic. Additionally, the electronic device is typically in the fluid path, thus further compromising the electromagnetic field. Furthermore, the stainless steel housing surrounding the filtering element also degrades the wireless performance. Because of these factors, it may be necessary to enhance or confine the electromagnetic field so as to maximize its effect near the electronic device.

In one embodiment, the reflective antenna 480 is located in the hollow inner cylinder of the filtering element 400. The loop 480 may be near the closed end 420, so as to be near the electronic device 470. Alternatively, it may be located in any other suitable location. Preferably, the reflective antenna 480 is molded into the frame 440 along its inner surface 455 so as not to be exposed to the fluid path. Thus, the reflective antenna 480 must be located between the hollow inner cylinder and the filter material.

In another embodiment, the reflective antenna 480 is located in the closed end 420 of the filtering element. Again, the reflective antenna is preferably molded into the plastic to as not to be exposed to the fluid flow.

In another embodiment, the reflective antenna 480 is located in the frame 440 along the outer surface 460 of the filtering device 400. Again, the loop is preferably molded into the plastic so as not to be exposed to the fluid flow.

Since the reflective antenna 480 is not connected, there is no need to supply any electrical conduits to the loop. Thus, its integration into the filtering element 400 is achieved by molding the loop into the plastic housing. As stated above, the exact location of the loop 480 within the filtering element is an implementation decision and is not limited by the present invention.

The above description recites the inclusion of a single reflective antenna in a filtering element. The invention is not so limited. For example, the reflective antenna may have as many turns as are necessary. Similarly, more than one reflective antenna may be incorporated into a single filtering element. Moreover, it is contemplated that in an environment with multiple filtering elements within a single housing, that each filtering element may be equipped with its own associated reflective antenna. Alternatively, not all filtering elements within a housing need to be equipped with a reflective antenna.

The above description recites a gasket that exists between an upper and lower housing in a housing assembly; however, other locations are possible. For example, a gasket of the type described can be introduced between any two separable portions of the housing. For example, in certain embodiments, a gasket exists between the top vent and the top vent pipe. In this embodiment, it is possible to insert the gasket of the present invention between these two separable portions. Any location in which two separable portions of housing come together can be used to insert this gasket.

In the housing environment, there are other locations in which the reflective antenna can be placed. For example, often an alignment plate is placed atop the filtering element(s) to hold them in place. FIG. 3 shows the use of an alignment plate 330 to hold the plurality of filtering elements 310 in place. This alignment plate is typically constructed of stainless steel or other rigid materials that resist corrosion and retain the structural support during the process. Since this alignment plate is located near the closed end of the filtering elements 310, it can positively affect the electromagnetic field near the embedded electronic devices. The reflective antenna can be embedded in this plate in a number of ways. In one embodiment, the alignment plate is constructed in such a way as to fulfill its function to hold the filters as well as control the electromagnetic field. It is obvious to one skilled in the art to choose materials that resist degradation in the housing environment, are structurally sound and remain electrically neutral, such as a high temperature theromoplastic or thermosetting polymer. In a first embodiment, a single reflective antenna is embedded in the alignment plate such that it circumscribes all three filtering elements. In a second embodiment, a plurality of reflective antennae, preferably one for each associated filtering element is embedded. In this case, each reflective antenna circumscribes only its associated filtering element. The reflective antennae are easily integrated into the environment by simply placing the alignment plate atop the filtering elements. However, the reflective antenna need not be embedded in the alignment plate 330. In other embodiments, it is molded in place, adhered, heat bonded and affixed using any suitable method. Furthermore, the alignment plate may be a stainless steel plate to which plastic material containing one or more reflective antennae is affixed.

In addition to smart devices used in filter housings, the present invention has utility with disposable bioprocess solutions. Disposable bioprocess solutions replicate the basic unit operations of manufacturing processes by replacing the reusable permanent components with disposable components. Although there are numerous benefits to a disposable bioprocess solution, chief among them are the cost savings of eliminating maintenance from cleaning and testing. Disposable bioprocess solutions are generally made of low cost physically flexible components that are placed into a reusable support structures. A commercially available system such as a Mobius™ Disposable Solution from Millipore Corporation contains disposable components. Disposable components include tubes, connectors, bags such as for storage, mixing, cell growth (bioreactors), conducting reactions and the like, filters and other similar components. A bioprocess environment can be created on a flat surface, such as a tabletop, or stacked on a frame. The various components are arranged as required by the particular task. Often, many of these components are equipped by electronics or smart devices. These smart devices can be used to measure temperature, pressure, pH, concentration, or other information.

Fixtures or structures, often made of metal for strength, support the various components in this bioprocess setup. To power these smart devices, a powered inductive loop can be placed proximate to the bioprocess setup. In one embodiment, the powered loop is laid on the flat surface, circumscribing one or more elements of the bioprocess setup. The electromagnetic field generated by this loop is then used by one or each of the smart devices, using the technique described above. Additional powered loops may also be used for a cluster of elements or for each individual element as desired.

However, many of the challenges mentioned earlier, such as distance, aqueous environments, and high metal concentration can also be present in a disposal bioprocess setup. Therefore, to maximize the transfer of the electromagnetic power from the powered loop to the smart devices, a reflective antenna can be installed in some or all of the disposable pharmaceutical components.

In the case of bioreactor bags, the reflective antenna can be embedded in the material used to form at least a portion of the bag or the entire bag if desired, or may be affixed to at least a portion of the outer surface of the bag. In one embodiment, the electronic device is affixed to the outer surface of the bag, with the reflective antenna also affixed to the bag, around the device.

Figure 5:
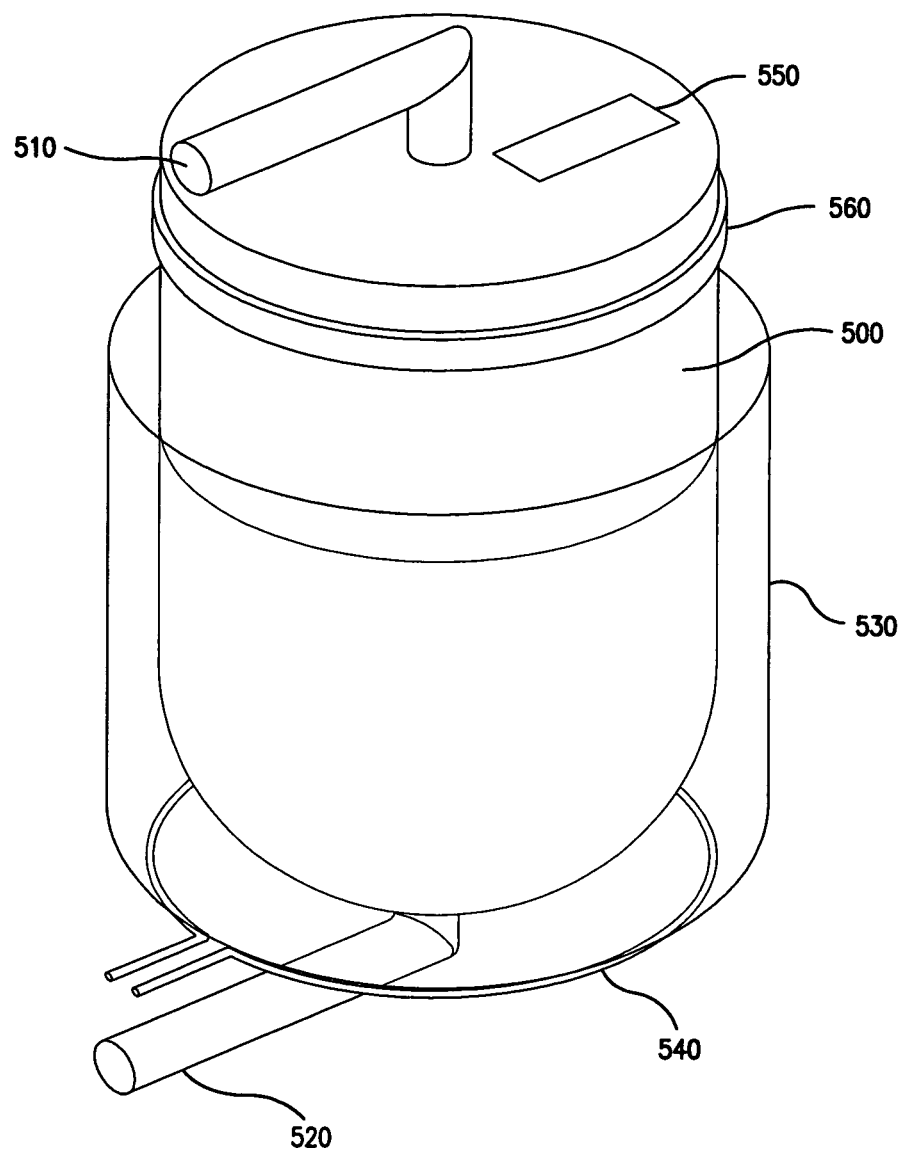
FIG. 5 shows a second embodiment of the present invention.

FIG. 5 illustrates an embodiment of the present invention for use with disposable bioprocess solutions. Bioreactor bag 500, having inlet conduit 510 and outlet conduit 520, is optionally placed in support structure 530. Located preferably on the flat support surface is a powered inductive loop 540. In FIG. 5, the loop 540 is located directly beneath the support structure 530, but the invention is not limited to this embodiment. The loop 540 may have a larger diameter and encircle multiple components. Furthermore, the inductive loop 540 may be embedded in a mat or other surface on which the disposable components are placed. In such a scenario, a series of loops that mimic the layout of the work flow can be embedded in the mat, such that the loops are positioned at the locations on which devices will be placed.

Located on bioreactor bag 500 is an electronic component, or smart device 550. To improve the electromagnetic field near this smart device, a reflective antenna 560 is placed around the bioreactor bag 500. While the reflective antenna 560 in FIG. 5 is located between the powered inductive loop 540 and the smart device 550, the invention is not so limited. It is also contemplated that the smart device is located between the reflective antenna 560 and the powered inductive loop 500.

In one embodiment, the reflective antenna 560 is affixed to the bioreactor bag 500, such as by heating. In another embodiment, the reflective antenna 560 is embedded in the bioreactor bag 500. In another embodiment, the reflective antenna 560 is affixed to the support structure 530, which in turn holds the bioreactor bag 500. In another embodiment, the reflective antenna 560 is embedded in the support structure 530. Those skilled in the art will recognize that a variety of techniques may be used to affix the reflective antenna 560 to the bioreactor bag 500 or the support structure 530.

While the term bioreactor bag is used in the description above, it should be realized that the present invention can operate with any container. Furthermore, a similar approach can be used with other disposable components, such as tubes. The reflective antenna can be embedded in the plastic tube, or can be affixed, preferably to the outer surface of the tube.

Though someone skilled in the art of inductive antenna design may be able to maximize the induced current by optimizing the source and receiver coil, there may still be limits of size or cost of the receiver coil. The integration of a reflective antenna in a device potentially reduces cost and setup complexity by improving the electromagnetic flux relative to the device. This can be especially true for disposable bioprocess solutions where the user, not the manufacturer of the devices will determine the physical setup of the devices. This invention improves the flexibility of the physical setup at the user site.

It is known that the use of a reflective antenna to improve the induction of electrical power can also be used to improve the ability to communicate wirelessly with the end device. A powered antenna can be used as a transceiver antenna with a modulated electrical signal that supplies power and two-way communication to the end device. This is the typical function of RFID reader antennae. Similarly in FIG. 5, the biopharmaceutical bioreactor bag 500 may have an electronic label that must be visible to the user on the top of the bag. Scaling the bioreactor bag up in height may compromise ability for the electronic label to communicate with the powered communication loop. An appropriately placed reflective antenna 560 will communicate well in an electrically aggressive environment. A single reflective antenna can be used for power and communication of the electronic label to the reader.

Though the embodiments in this disclose primarily describe magnetic induction loops, this invention is not so limited. The reflective antenna can also be of a different shape, such as that of a dipole, more typically used for communications.

What is claimed is:

1. A filtering element comprising:
   a. a cylindrical body, having a membrane having an outer surface exposed to unfiltered material and an inner surface;
   b. a closed end;
   c. an open end through which filtered material passes;
   d. a wireless electronic device affixed to said filtering element, said electronic device comprising an antenna adapted to receive an electromagnetic field generated by a powered loop antenna and convert it to alternating current; and
   e. an unpowered electromagnetically resonant antenna affixed to said filtering element positioned so as to enhance said electromagnetic field received by said electronic device.

2. The filtering element of claim 1, wherein said unpowered antenna is affixed to said inner surface of said cylindrical body.

3. The filtering element of claim 1, wherein said unpowered antenna is affixed to said outer surface of said cylindrical body.

4. The filtering element of claim 1, wherein said unpowered antenna is affixed to said closed end.

5. The filtering element of claim 1, wherein said electronic device is affixed to said closed end.

6. The filtering element of claim 1, wherein said unpowered antenna is in the shape of a loop.

7. A filtering system, comprising:
   a. a housing;
   b. a powered inductive loop inside said housing;
   c. a filtering element, located with said housing, comprising a membrane and a wireless electronic device, said electronic device comprising an antenna adapted to receive an electromagnetic field generated by said powered inductive loop and convert it to alternating current; and
   d. an unpowered electromagnetically resonant antenna located with said housing positioned so as to enhance said electromagnetic field received by said electronic device.

8. The filtering system of claim 7, further comprising an alignment plate within said housing, wherein said unpowered antenna is affixed to said alignment plate.

9. The filtering system of claim 7, further comprising an alignment plate within said housing, wherein said unpowered antenna is embedded in said alignment plate.

10. The filtering system of claim 7, wherein said unpowered antenna is affixed to said housing.

11. The filtering system of claim 7, wherein said unpowered antenna is affixed to said filtering element.

12. The filtering system of claim 7, wherein said unpowered antenna is in the shape of a loop.

13. A disposable system for manufacturing pharmaceuticals, comprising:
    a. a powered inductive loop;
    b. a container for holding pharmaceutical material, comprising an electronic device, said electronic device comprising an antenna adapted to receive an electromagnetic field generated by said powered inductive loop and convert it to alternating current; and
    c. an unpowered electromagnetically resonant antenna positioned so as to enhance said electromagnetic field received by said electronic device.

14. The system of claim 13, wherein said unpowered antenna is affixed to said container.

15. The system of claim 13, wherein said unpowered antenna is embedded in said container.

16. The system of claim 13, wherein said electronic device comprises a sensor.

17. The system of claim 13, wherein said electronic device comprises a wireless communication device.

18. The system of claim 13, wherein said electronic device comprises a storage element.

19. The system of claim 13, wherein said container comprises a bioreactor bag.

20. The system of claim 13, wherein said container comprises a tube.

21. The system of claim 13, further comprising a support structure to support said container, wherein said unpowered antenna is affixed to said support structure.

22. The system of claim 13, further comprising a support structure to support said container, wherein said unpowered antenna is embedded in said support structure.

* * * * *